(12) United States Patent
Clegg

(10) Patent No.: US 7,240,442 B2
(45) Date of Patent: Jul. 10, 2007

(54) FOLDING MAGAZINE INSERT

(76) Inventor: Timothy Clegg, 19220 S. Normandie Ave., Torrance, CA (US) 90502

( * ) Notice: Subject to any disclaimer, the term of this patent is extended or adjusted under 35 U.S.C. 154(b) by 339 days.

(21) Appl. No.: 10/817,250

(22) Filed: Apr. 3, 2004

(65) Prior Publication Data
US 2005/0227214 A1 Oct. 13, 2005

(51) Int. Cl.
G09F 1/00 (2006.01)
(52) U.S. Cl. .................................. 40/124.03
(58) Field of Classification Search ................ 283/65; 40/455, 902, 124.1; 446/147, 397, 404
See application file for complete search history.

(56) References Cited

U.S. PATENT DOCUMENTS

| | | | | |
|---|---|---|---|---|
| 4,286,399 A * | 9/1981 | Funahashi et al. | ........ | 40/124.02 |
| 4,433,783 A * | 2/1984 | Dickinson | ................... | 206/484 |
| 5,230,501 A * | 7/1993 | Melton | ......................... | 270/41 |
| 5,245,171 A * | 9/1993 | Fox et al. | ................... | 235/492 |
| 5,275,285 A * | 1/1994 | Clegg | ......................... | 206/449 |
| 5,577,918 A * | 11/1996 | Crowell | ...................... | 434/319 |
| 5,761,836 A * | 6/1998 | Dawson | ................... | 40/124.03 |
| 5,778,574 A * | 7/1998 | Reuben | ................... | 40/124.03 |
| 6,104,306 A * | 8/2000 | Hogue et al. | ............ | 340/686.1 |
| 6,126,201 A * | 10/2000 | Pace et al. | ..................... | 281/29 |
| 6,226,959 B1 * | 5/2001 | Krasuski et al. | .............. | 53/117 |
| 6,591,523 B2 * | 7/2003 | Pines | ...................... | 40/124.03 |
| 6,905,019 B2 * | 6/2005 | Lacomis | ..................... | 206/312 |

* cited by examiner

Primary Examiner—Lesley D. Morris
Assistant Examiner—Christopher Veraa
(74) Attorney, Agent, or Firm—Clement Cheng

(57) ABSTRACT

A sound-producing folding insert for a magazine is disclosed. A foldable support structure comprises a primary page and a secondary page. The secondary page is folded upon itself to form a pocket that retains a sound emitting means. The sound emitting means includes an electronic microchip sound generating device that includes a switch means connected at one end to a slidable tongue mechanism that is attached at the other end to the primary page, such that upon opening of the folding insert by separating the primary and secondary pages the slidable tongue mechanism allows the switch means to close, thereby activating the sound emitting means. Conversely, closing the folding insert brings the primary and secondary pages together forces the slidable tongue mechanism to open the switch means, and thereby deactivating the sounds emitting means. The sound emitting means is relatively flat and includes a generally flat speaker mounted to the secondary page. Generally flat button batteries are included to power the device when the sound emitting means is activated.

7 Claims, 5 Drawing Sheets

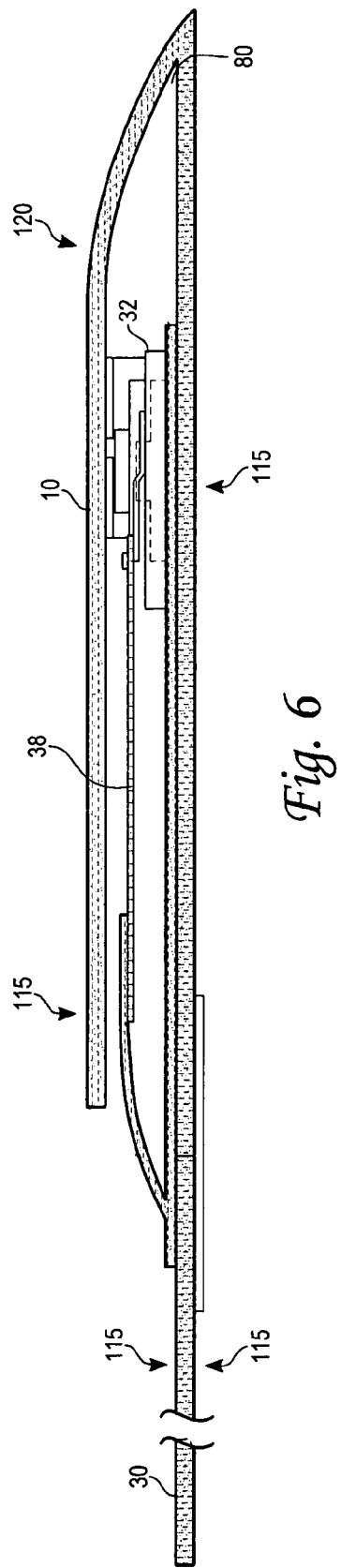
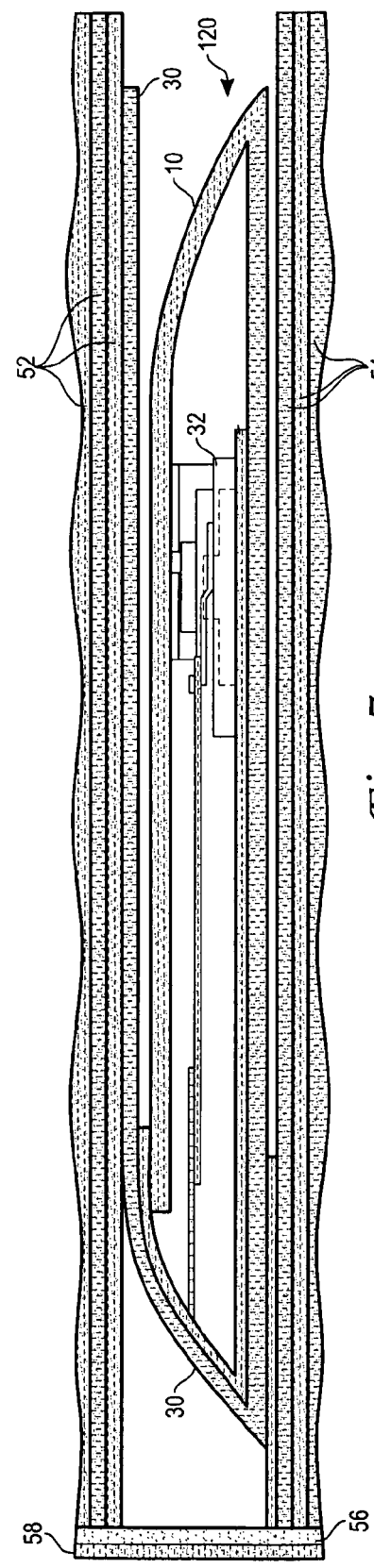

FOLDING MAGAZINE INSERT

FIELD OF THE INVENTION

The present invention relates generally to audio signal emitting devices, and, more particularly, to a foldable magazine insert that produces an audio signal when opened.

DISCUSSION OF RELATED ART

Pre-programmed or programmable talking "things" have been the objects of a number of patents. For example, Barnett et al. (U.S. Pat. No. 3,462,157) teaches an audible greeting card comprising a pair of panel members, the first panel carrying a sound track, and the second one having a sound pick-up member and an amplifier speaker which is actuated by the sound pick-up member.

Other prior patents include Deffner (U.S. Pat. No. 4,035,941) who teaches an audio-visual display device which sequentially displays and describes merchandise. A timer is used to control the operation of a plurality of electrical audio and visual display components.

Tarrant et al. (U.S. Pat. No. 4,222,188) teaches a sound reproducing device for either music or speech combined with a display for an opaque sheet on which an insignia is defined that may be a work of art, photograph, printed material or the like. The display is a part of a resonator box that not only amplifies the volume of the sound reproducing device, but provides a number of spaced recesses in the upper portion thereof in which merchandise such as cosmetics or the like may be displayed.

Bearden (U.S. Pat. No. 4,381,558) teaches another talking greeting card, this one having a front display panel and two rear panels adapted to hold the front panel bowed in convex shape by tabs which secure the rear panels together. A flexible sound recording strip extends through a slot in the bowed front panel and has a surface prepared to produce sounds when a sliding element, such as the thumbnail of a user, moves along the surface. The bowed front wall and overlapping rear walls amplify the sound.

Calloway et al. (U.S. Pat. No. 4,611,262) teaches an electrical circuit package for greeting cards which provides an electrical circuit via a stamped and formed lead frame supported and insulated in a dielectric housing. When activated, the electrical circuit causes a piezoelectric transducer to generate audio signals in the form of a musical tone, spoken words or both.

Montgomery et al. (U.S. Pat. No. 4,703,573) teaches a visual and audible activated work comprising at least two pivotably turnable pages. A visual image display is affixed to at least one of the pages. The visual image display has first and second visual activation states; the first visual activation corresponds to no visual image and the second visual activation state provides a visual image on the visual display. A sound generator is also attached to the work. Electrical control means are connected to the visual display to selectively activate the visual display from one of the visual activation states to another upon pivoting the pages from the open position to the closed position; and the same or similar control means are connected to the sound generator to selectively activate the sound generator to create sound upon pivoting the pages from the closed position to the opened position. Photovoltaic or solar cells are taught for providing power to the audio and/or visual portions of this work.

Kondo (U.S. Pat. No. 4,791,741) teaches card or postal media which can record and playback messages or music, such media being particularly useful to allow the mailer to record his/her own messages or desired music, so that the recipient can easily play them back. The card comprises electrical means (RAM, including one or more microchips) for storing audio information picked up by a microphone; means for generating sound including a speaker; means for producing a mode selection signal corresponding to either a record mode or a playback mode; electrical control means including a TOSHIBA TC 8830 microchip for selectively setting either of the record or playback modes according to the mode selection signal from the signal producing means, converting audio from the microphone from analog to digital and storing it in the storage means when the record mode is selected, retrieving stored information from the storage means converting it from digital to analog, and outputting the analog signal to the generating means when the playback mode is selected; and a card board on which each of the above are mounted.

Hoshi (U.S. Pat. No. 4,934,079) teaches a display device including a display panel having a recorder/playback combination and a sensor that is sensitive to light, sound, heat and/or other stimuli. When approaching the panel, objects which are transparent to or shield light and/or which generate sound or heat will automatically actuate the sensor to automatically actuate the recorder/playback combination, thereby producing music or sound from the display panel. The recorder/playback combination can be made thin, small and inexpensive by the use of an IC memory. An on-off switch may be substituted for the sensor. If the sensors are made integral with the recorder/playback combination, then it is possible to obtain increased efficiency and make handling much easier. The use of an IC memory chip for the sound generating source permits free selection of sounds or music. The sounds or music are recordable on the IC chip by an external ROM writer. Playback is obtained automatically by the actuation of the on-off switch or by the sensor which is sensitive to sound, light, heat and the like to produce a sound message.

Johnson et al. (U.S. Pat. No. 5,063,698) teaches a personalized greeting card including an independent, detachable, electronic IC memory device that stores electronic signals, a mechanism for retrieving the electronic signals from the IC memory device, a voice synthesizer which obtains these electronic signals and produces audible sounds representative of the personalized message represented by the electronic signals, and a switch that controls the retrieving device and the voice synthesizer. An EPROM translator machine which converts a personalized message to electronic signals which are stored in the IC memory device separately preprograms the IC memory device. The memory device is then detached from the EPROM and mounted in the circuitry disposed in the greeting card. Both the IC memory device and the voice synthesizer are coupled to a timer by a control/power line. A battery is used to deliver power to this circuit.

Fox et al. (U.S. Pat. No. 5,245,171) teaches a mailing piece comprising a mailing envelope which has a reusable audible message generator attached thereto. The message generator may be secured (as by adhesive) to the envelope. The message generator provides an audible message which is intended to induce the recipient to retain, read and show the package to others. The envelope has a tab extending therefrom which, when pulled by the recipient, exposes an operating element to activate a talking device which gives a short message. A solar cell or other sensor responsive to light that acts to close (or to power) the electrical circuit of the message generator may be used to activate the message generator when the tab is pulled up to expose that sensor to light.

Clegg (U.S. Pat. No. 5,275,285) teaches an audio signal emitting receptacle comprising a sound emitting means and a foldable support structure suitable for holding a business card, credit card, or the like. When the receptacle is opened, an audio signal emitting means is activated by a slide tongue mechanism. Such a device, however, is not well suited for insertion into a printed, bound document such as a magazine, and would be prohibitively expensive to assemble into an outer magazine insert due to its specialized nature of holding a business card or the like.

Therefore, there is a need for an inexpensive audio signal producing apparatus that is better suited for quick and easy insertion into a printed document, such as a magazine. A mass produced device would allow an advertiser to reach millions of readers with an audio as well as a visual message. The present invention accomplishes these objectives.

The above listed devices even if modified would not be successfully inserted into a printed document such as a magazine. Previous configurations jammed high-speed printing and binding presses for nationally circulated magazines.

SUMMARY OF THE INVENTION

The present device is a folding insert for inserting into a printed document having a plurality of pages, such as a magazine. The insert includes a means for emitting a sound that is incorporated into a foldable support structure. When the support structure is in a closed, folded position, the means for emitting a sound is not active. However, when the support structure is moved from a closed, folded position to an open, unfolded position, the means for emitting a sound is activated and a predetermined sound is produced. Such a sound may be music, speech, sound effects, or the like, used to draw attention to, for example, a printed message on the pages of the insert.

Preferably the means for emitting a sound comprises an electronic microchip sound generating device comprised of a generally flat-shaped speaker, a microchip controller mounted to a circuit board, a switch means, and a battery means. In such an embodiment, the speaker, microchip controller, circuit board, switch means, and battery means are all electronically connected in such a way that upon closing of the switch means the circuit is completed and the microchip controller causes the predetermined sound to be produced by the speaker. In one embodiment of the invention, the speaker is mounted to the circuit board, while in another embodiment of the invention the speaker is mounted face-down and adjacent to the circuit board against the foldable support structure and is connected to the circuit board with wires.

A slide tongue mechanism having a pair of ends is included such that one end thereof is slidably connected to the electronic microchip sound generating device such that sliding of the tongue mechanism generally along one dimension causes either activation or deactivation of the sound generating device. The other end of the tongue mechanism is attached to the foldable support structure. In one embodiment, the other end of the tongue mechanism includes a tongue attachment means that is fixed to the foldable support structure with double-sided tape or the like. As such, the folding or unfolding of the foldable support structure causes the tongue mechanism to either deactivate or activate the electronic microchip sound generating device, respectively.

The foldable support structure comprises a primary and secondary page joined at a common edge. The secondary page is further folded over itself along a fold line generally parallel to the common edge of the primary and secondary pages, and held in said further folded position by double sided tape adhered at a top edge, a bottom edge, an inner edge and at channel edges such that the channel edges form a channel that retains the tongue mechanism therein. The microchip sound generating device is held within a generally flat-shaped pocket formed by the folded secondary sheet in such a way that the microchip sound generating device is retained about halfway between the vertical and horizontal midpoint of the secondary page and the outer edge of the secondary page.

A modular template formed from a sheet of flexible film or other generally flat and durable sheet material may be further included for mounting of the microchip sound generating device. Such a modular template would include on a top side thereof a tongue stick section attached to the other end of the tongue mechanism, and a speaker section and a battery section for mounting of the speaker section and battery section thereon with glue or other suitable adhesive. The bottom side of the modular template film would include a contact adhesive such as sticky tape or the like having a removable liner such that when the liner is removed, the adhesive is exposed so that the modular template may be quickly and easily fixed to the primary and secondary pages.

In use, with the foldable section in a closed and folded position, the tongue mechanism is positioned preferably between two contacts of the switch means of the microchip controller. As the tongue mechanism is formed from a non-conductive material, the circuit is not complete and no sound is produced by the sound emitting means. However, when the foldable section is moved from its closed and folded position to an open and unfolded position, such that the primary and secondary pages are pulled away from each other, the tongue mechanism is pulled away from between the contacts of the switch means of the microchip controller, completing the electronic circuit, and cause the predetermined sound to be produced from the speaker. The predetermined sound is produced for a predetermined period of time, after which the microchip controller becomes inactive. The sound may be produced again by folding the primary and secondary sheets together once more, forcing the tongue mechanism between the contacts of the switch means and thereby resetting the electronic microchip sound generating device.

The invention as described results in an inexpensive device suitable for insertion into a magazine, or the like. The device has a generally flat profile, allowing the magazine to fully close so as to facilitate stacking, shipping, and the like. Further, the present invention is easily assembled, reducing the labor costs incurred when assembling large numbers of the device. The preferred button batteries used to power the device are of sufficient capacity as to allow the device to be operated repeatedly for several months. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 6 is a diagram, showing the device in assembled closed position and the dimensions are exaggerated for clarity.

FIG. 7 is a diagram showing the device received into a binding and the dimensions are exaggerated for clarity.

DETAILED DESCRIPTION OF THE PREFERRED EMBODIMENT

Figure 4:
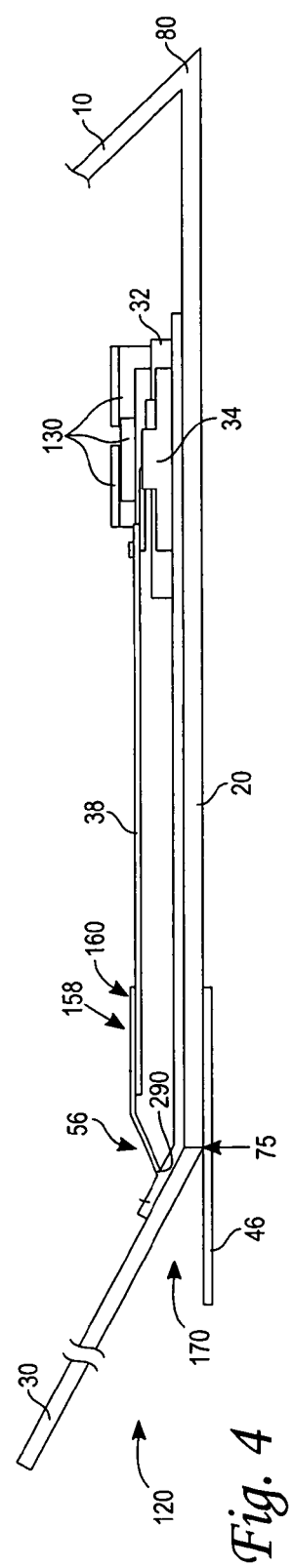
FIG. 4 is a cross-sectional view of the invention, illustrating a slide tongue mechanism attached at one end to a switch means of an electronic microchip sound generating device, and attached at the other end to a tongue stick section of the modular template, illustrating the modular template in an open position.
Figure 5:
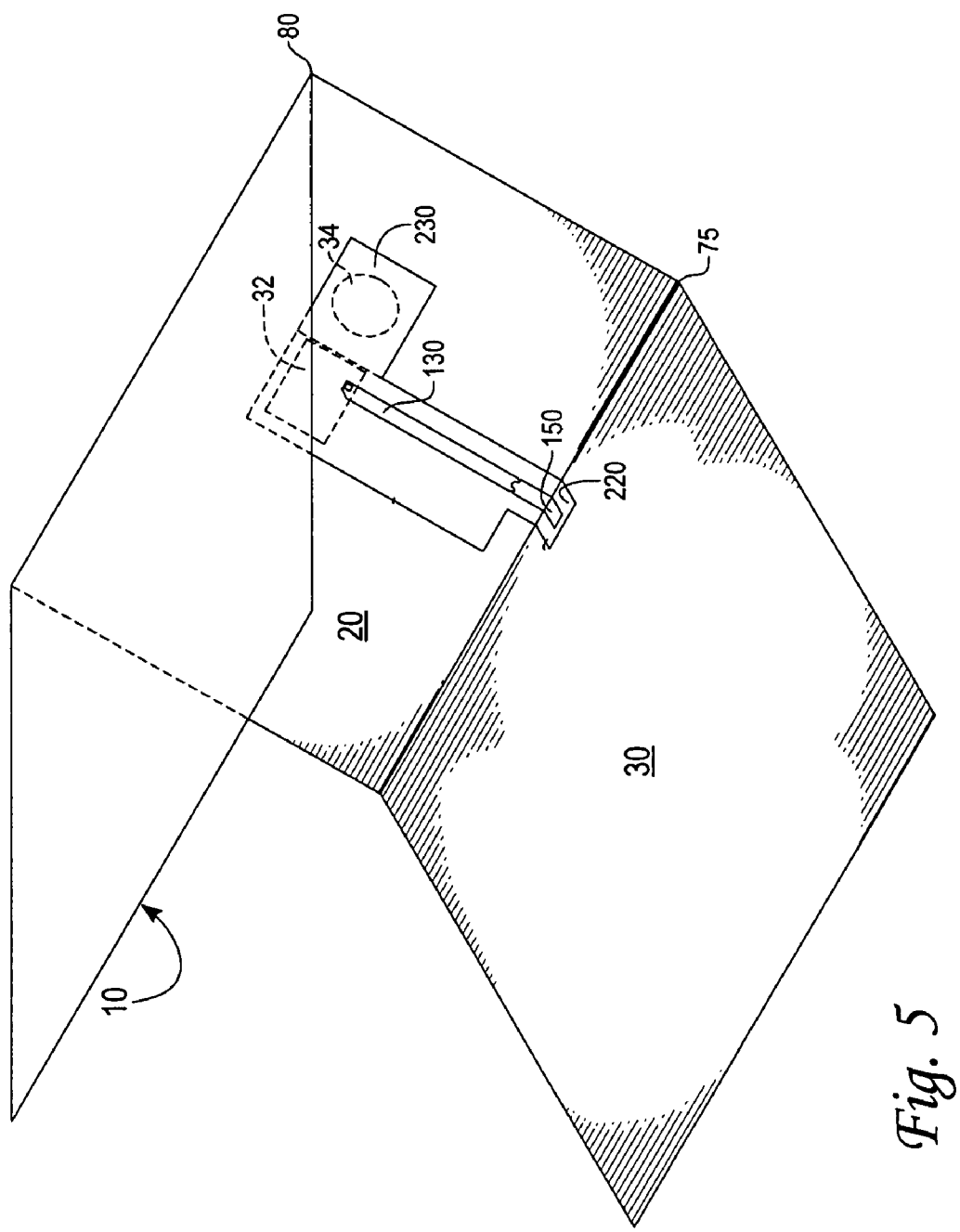
FIG. 5 is a diagram showing a perspective view of a partially folding device.

The present device is a folding insert 110 (FIG. 1) for inserting into a printed document having a plurality of pages, such as a magazine. The insert 110 includes a sound emitting means 34 that is incorporated into a foldable support structure FIG. 6, FIG. 4, 120 made of a paper stock or other suitable flat sheet material. When the support structure 120 is in a closed, folded position, the sound emitting means 34 is not active, and no sound is produced. However, when the support structure 120 is opened from a closed, folded position to an open, unfolded position (FIG. 4), the sound emitting means 34 is activated and a prerecorded sound is produced. Such a sound may be music, speech, sound effects, or the like, to present a multimedia visual and audio message when the reader views the printed message FIG. 1, 115 on the insert 110.

Preferably the sound emitting means comprises an electronic microchip sound generating device comprised of a generally flat-shaped speaker 34, a microchip controller 35 mounted to circuit board 32, a switch means 255, and a battery means 190. (FIG. 2) In such an embodiment, the the speaker 34, microchip controller 35, circuit board 32, switch means 255, and battery means 190 are all electronically connected in such a way that upon closing of the switch means 255 a circuit is completed and the predetermined sound is produced by the speaker 34. In one embodiment of invention, the speaker 34 is mounted to the circuit board 32, while in another embodiment of the invention the speaker 34 is mounted face-down and adjacent to the circuit board 32 against the foldable support structure 120 and is connected to the circuit board 32 with wires 305.

A slide tongue mechanism 38 having a pair of ends 150 is included such that one end 55 thereof is slidably connected to the electronic microchip sound generating device 35 such that sliding of the tongue mechanism 38 generally along one dimension causes either activation or deactivation of the sound generating device 35. The other end 56 of the tongue mechanism 38 is attached to the foldable support structure 120. In one embodiment, the other end 56 of the tongue mechanism 38 includes a tongue attachment means 158 that is fixed at a top side FIG. 4, 160 and a bottom side 170 thereof to the foldable support structure 120 with double-sided tape 48 or the like. As such, the folding or unfolding of the foldable support structure 120 causes the tongue mechanism 38 to either deactivate or activate the electronic microchip sound generating device, respectively.

The foldable support structure 120 comprises a primary page 30 and a secondary page 20 joined at a common edge 75. The secondary page 20 is further folded over itself along a fold line 80 generally parallel to the common edge 75 of the primary and secondary pages and held in said further folded position by double sided tape 48 adhered at a top edge 300, a bottom edge 310, an inner edge 122 and at channel edges 130 such that the channel edges 130 form a channel 140 that retains the tongue mechanism 38 therein.

Double sided adhesive tape is preferably applied to the inside of secondary page 20, but can also be applied to the outside portion of secondary page 10. In both cases, the folded product is the same. When the adhesive tape is applied to the inside of the secondary page 20, the secondary page 20 can be printed showing an outline for the location of tape application. Similarly, the outside portion of secondary page 10 can receive printing showing an assembly person the outline for the location of the tape application.

The channel tape 130 forming the channel 140 can similarly be placed on either the secondary page outside portion 10 or the secondary page inside portion 20. The printing of the outline should have light lines such that it has minimal interference with the printing of the commercial messages 115. Although the inside of secondary page 20 adheres to outside of secondary page 10, darker lines are not preferred for the adhesive tape template guidelines because of potential interference with the look of commercial messages 115.

Instead of printing only the outline, the tape location can be indicated by shading the locations where the double-sided tape must be applied. The shading again should be light so that it does not interfere with the commercial messages 115. Also, the visual tape location indication can be omitted for experienced assembly people.

Figure 3:
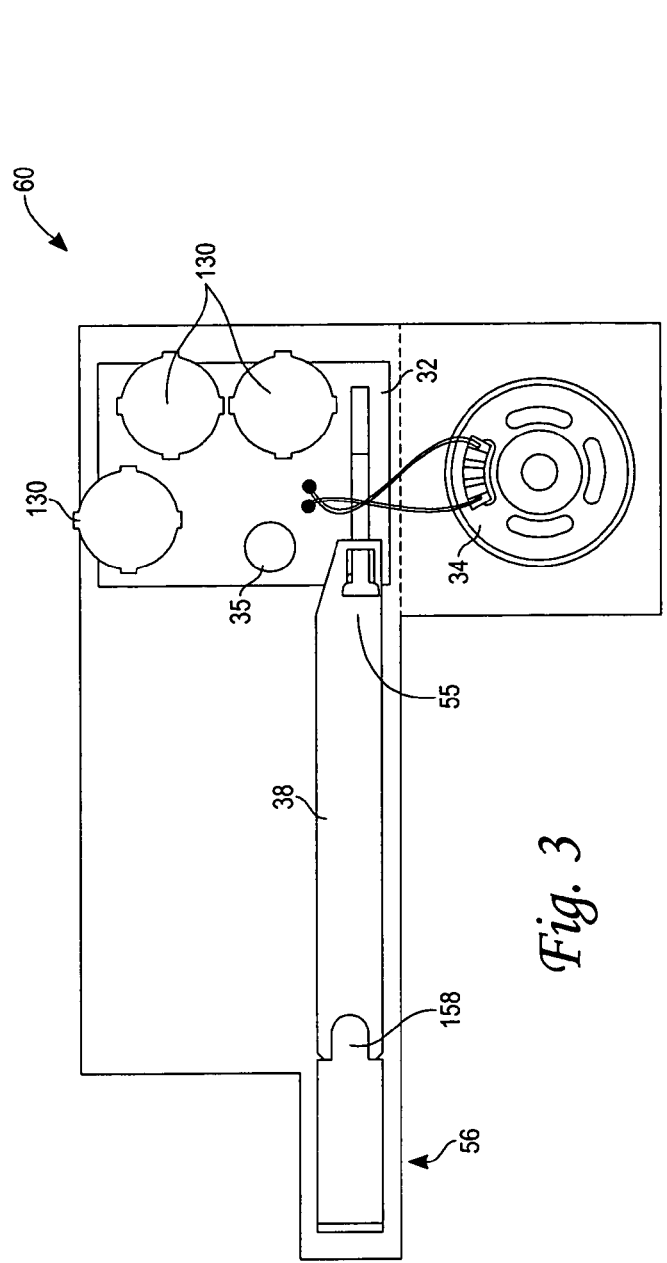
FIG. 3 is a top view of the modularly attachable sound emitting means.

The dotted line in FIG. 3 between the speaker panel 34 and the circuit chip panel above shows that the speaker panel can be overlapping, underlapping or exactly adjacent to the circuit chip panel. Usually, during hand assembly the speaker is not exactly aligned so that the panel interface is flush. Error and misaligned panels are expected and do not diminished the function of the overall device as long as the speaker is placed in the approximate required location. In the best mode, the speaker is placed below the circuit chip board at about two-thirds of the page away from the main folding line.

The microchip sound generating device is held within a generally flat-shaped pocket formed by the folded secondary page 20 in such a way that the microchip sound generating device is retained about halfway between the vertical and horizontal midpoint of the secondary page 20 and the outer edge fold line 80 of the secondary page 20.

A modular template 60 formed from a sheet of flexible film or other generally flat and durable sheet material may be further included for mounting of the microchip sound generating device The modular template 60 is modular because it has a plurality of modules. Each of the modules can be called a section. It is more efficient to form the sections generally rectangular in shape. A single modular template 60 can be used for different sized magazines by detaching certain sections from the template allowing changing of the footprint to best suit different sized and different shaped magazines.

Figure 2:
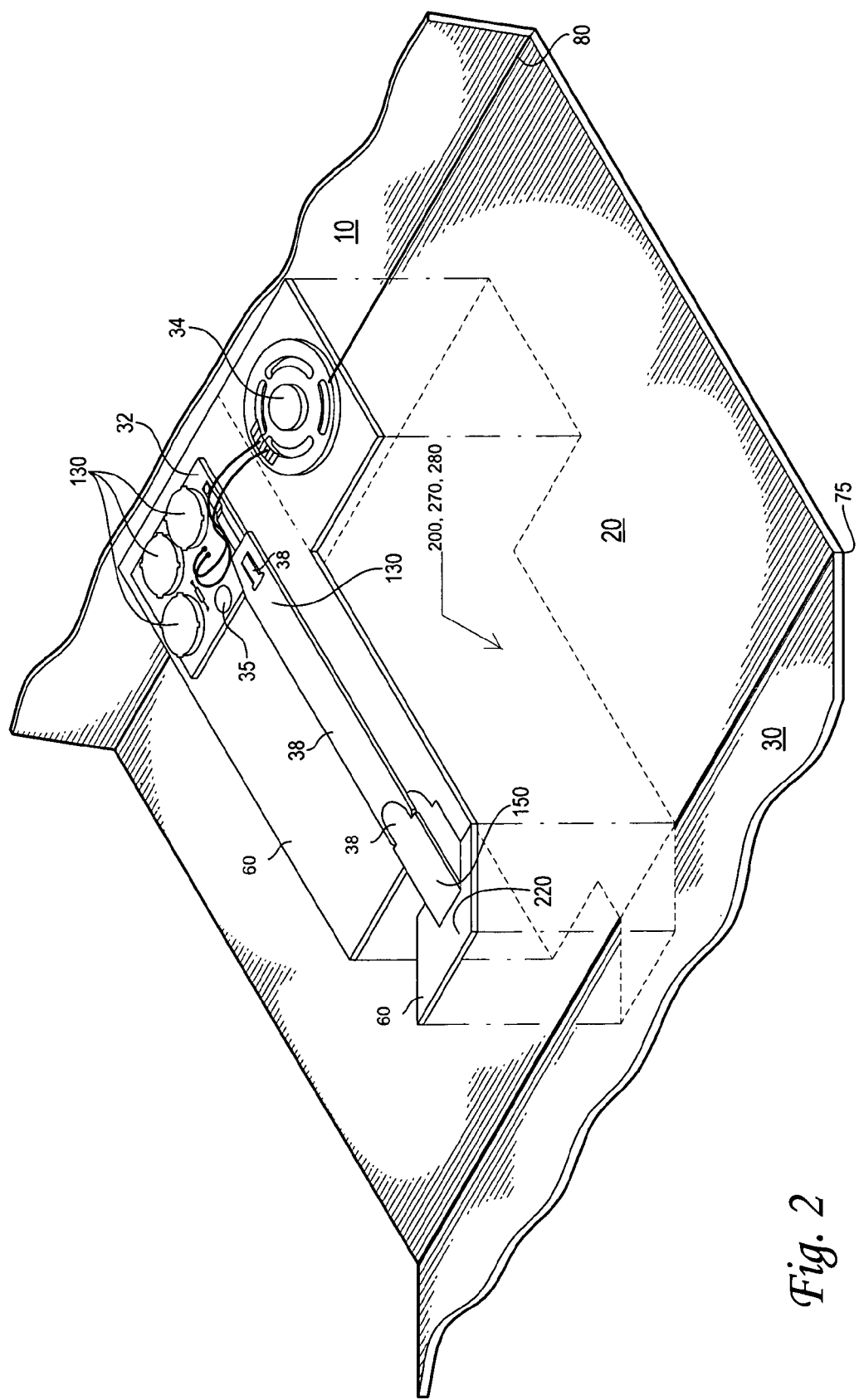
FIG. 2 is an exploded view illustrating a modular template with a sound emitting means attached thereto, and a foldable support structure for retaining the modular template.

The footprint is shown in FIG. 2 and is defined as the location where the sections adhere to the inside of the secondary page 20. Such a modular template 60 would include on a top side thereof a tongue stick section 220 attached to the other end 56 of the tongue mechanism 38, and a speaker section 230 and a battery section 240 for mounting of the speaker section 230 and battery section 240 thereon with glue or other suitable adhesive means. A joint 290 may preferably be formed at the intersection of the tongue stick section 220 and the battery section 240 by taping a front and backside of the intersection.

The battery configuration is made of button batteries laid flat and mounted on the battery panel. The batteries are commonly mounted on a printed circuit board. Three 1.5v batteries is the preferred mode for implementing the battery panel configuration. Alternative battery configurations can be implemented as one 1.5v, two 1.5v, or one 3v battery. These options are applicable to SNM and SSE types of MASK. These battery configurations can be mounted in the battery panel that can be modularly attached to the folding insert.

The modular template 60 appears to be formed as an L shaped template. However, the modular template was actually formed in a rectangular configuration in its initial state. The speaker section is removed from the corner near the tongue stick section 220 and placed below the circuit board 32 section.

The bottom side of the modular template film 200 would include a contact adhesive such as sticky tape 270 or the like having a removable liner 280 such that when the liner 280 is removed, the sticky tape 270 is exposed so that the modular template 60 may be quickly and easily fixed to the primary and secondary pages 20. The modular template 60 serves to maintain accurate placement and spacing of the tongue mechanism 38 with respect the two ends 55, 56 thereof, the first page 60, and the switch means 255. This facilitates assembly and improves the percentage of operational inserts 110 after assembly thereof.

In use, with the foldable section 30 in a closed and folded position, the tongue mechanism 38 is positioned preferably between two contacts of the switch means 255 of the microchip controller. The tongue mechanism 38, at least at its first end 55, is formed from a non-conductive material, and as such, the circuit is not completed and no sound is produced by the emitting means. However, when the foldable section 30 is moved from its closed and folded position to an open and unfolded position, such that the primary and secondary pages are pulled away from each other, the tongue mechanism 38 is pulled away from between the contacts of the switch means 255 of the microchip controller, completing the electronic circuit, and cause the predetermined sound to be produced from the speaker 34. The predetermined sound is produced for a predetermined period of time, after which the microchip controller becomes inactive. The sound may be produced again by folding the primary and secondary pages together once more, forcing the tongue mechanism 38 between the contacts of the switch means 255 and thereby resetting the electronic microchip sound generating device to its initial condition.

Figure 1:
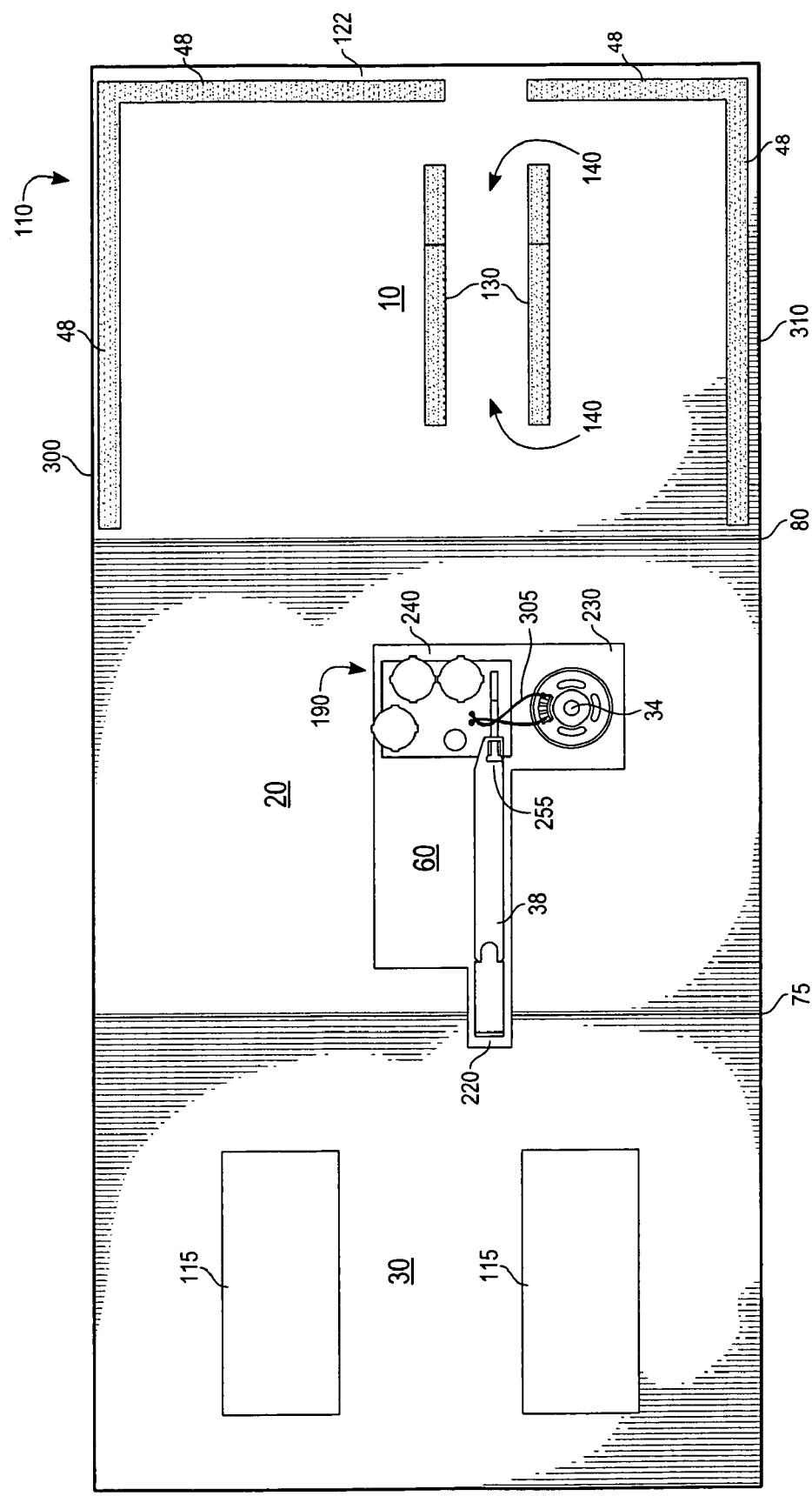
FIG. 1 is a top open view of the invention.

Figure five shows the process of folding first along fold 80 and subsequently fold line 75. For clarity, the double-sided tape is not shown. The double sided tape may be placed on the inside sheet 20 or the outside sheet as shown in FIG. 1.

Various panels can be combined and not scored to allow separation of the panel. Combination of panels reduce the total number of panels required because of combination of functions. Combination of panels and variation of panels allow a publisher to interchange modules and change the activation mechanism as well as the trigger mechanism while keeping the same speaker panel and battery panel.

The trigger panel can be changed from the slide. The trigger can be reversed for activation when electrical contact is made on a push mechanism. The push mechanism can be a small dome or membrane having silk screened conductive material with an electric insulator between these two silk screened surfaces. The push mechanism is sensitive to pushing. The unfolding of the device can send a signal on a dome or membrane device.

Alternatively, a light sensor such as a solar cell can trigger and replace the slide tounge by activating the circuit board circuit to play the prerecorded message whenever the pages are opened.

Also, a magnetic relay can replace the direct contact mechanism of the slide tounge by activating when a magnet in close proximity is moved away from the magnetic relay allowing the relay to be open. The magnets can be adhered to the side of the slide tounge so that opening the insert moves the slide which moves the magnet away from the relay and thus activates the recorded message. Magnetic relay is not the best mode and may be expensive to implement.

According to the preferred embodiment, the folding of the primary and closed secondary page forms a fold line. The fold line forms a hinge allowing opening and closing of the primary and secondary pages. The secondary page is formed of a pair of pages adhering to each other to close and form a single sheet. The fold line is exposed to a user on its upper side and receives an insertion flap 46 on its lower side. The insertion flap 46 is a long strip of paper with adhesive adhering the bottom of the fold line to the single sheet of paper. The insertion flap 46 is inserted into the magazine as a single sheet of paper. The insertion flap 46 retains the foldable support structure including the means for producing sound.

The cross sectional view in FIG. 6 is a diagram with the actual dimensions exaggerated for clarity. The drawings in figure six and seven have been exaggerated in the vertical dimension for clarity. The advertising messages 115 shown in FIG. 6 appear on the top and bottom side of the sheet. The slide tongue 38 is shown with clearance between the sheets, but the actual sheet has a flatter speaker module panel 32, and flatter battery and printed circuit board assembly panel so that the slide tongue does not actually have space to bend or buckle. The double-sided adhesive strips FIG. 1, 130 forms a channel and retains sheet 20 against the opposite sheet 10.

The foldable support structure including the insertion flap is stacked in a tray for automatic machine insertion via a high-speed bindery. A bindery machine may insert over a million copies of the foldable support structure including the means for producing sound into a magazine run. The magazine receives the foldable support structure as if it were a single sheet of paper of approximately the same physical qualities as any other page of paper in the magazine.

Figure seven similarly has vertically exaggerated dimensions and features and does not accurately reflect all details of the actual physical device. The diagram shows the position of the slide relative to the insert structure 120, and shows other pages of the magazine above 52 and below 54 held in adhesive 56 and bindery 58. The actual construction is flat and allows insertion into a high-speed bindery machine.

The invention as described results in an inexpensive device suitable for insertion into a magazine, or the like. The device has a generally flat profile, allowing the magazine to fully close so as to facilitate stacking, shipping, and the like. Further, the present invention is easily assembled, reducing the labor costs associated with assembly of the device. Three preferred button batteries 130 used to power the device are of sufficient capacity as to allow the device to be operated repeatedly for several months.

While a particular form of the invention has been illustrated and described, it will be apparent that various modifications can be made without departing from the spirit and scope of the invention. For example, the exact placement of the sound emitting means may vary within the pocket formed by folding the secondary page 20. The tape 90 may alternately be a dab of glue. Accordingly, it is not intended that the invention be limited, except as by the appended claims.

The invention claimed is:

1. A folding magazine insert comprising: a means for emitting a sound enclosed in a foldable support structure, emitting sounds upon unfolding; said means for emitting a sound comprising an electronic microchip sound generating device, and a slide tongue mechanism having a pair of ends wherein one of the two ends is connected to the electronic microchip sound generating device and the other end is attached to the foldable support structure so as to activate the electronic microchip sound generating device upon the unfolding of the foldable support structure, the foldable support structure comprising a primary page and a secondary page, the electronic microchip sound generating device held in the secondary page by folding the secondary page, wherein the secondary page is folded-over itself along a fold line and held together by double sided tape adhered at a top edge, bottom edges, inner edge and channel edges thereof; wherein the inner edge is the edge close to the fold between the primary and secondary page, wherein the channel edges form a channel retaining the tongue such that the microchip sound generating device is retained halfway between the vertical and horizontal midpoint of the secondary page and the outer edge of the secondary page.

2. The folding magazine insert of claim 1 further comprising a tongue attachment that is double taped on a top and bottom side adhering to the first page.

3. The folding magazine insert of claim 1 wherein the microchip sound generating device includes a flat speaker facing down.

4. The folding magazine insert of claim 1 wherein the microchip sound generating device includes a flat speaker facing up.

5. The unfolding magazine insert of claim 1 wherein the microchip sound generating device includes three 1.5 V button batteries.

6. The folding magazine insert of claim 1 wherein the microchip sound generating device is adhered to a film forming a modular template, the modular template having a tongue stick section, a speaker section and a battery section, wherein the battery section includes a microchip controller, each section adhered by glue to a sticky tape with a removable liner such that when the liner is removed, the sticky tape is revealed, the sticky tape sticking the modular section to the proper position on the first and secondary pages.

7. The folding magazine insert of claim 6 wherein the tongue distance between the tongue attachment means and switch on a microchip and battery section is held constant by the film, such that after adhering the film to the primary and secondary pages the distance between the attachment means and the switch is held constant.

* * * * *